United States Patent [19]

Blanchard et al.

[11] 3,797,311

[45] Mar. 19, 1974

[54] FLUID LEVEL METER

[75] Inventors: Robert L. Blanchard, Lexington;
Arthur E. Sherburne, Bedford;
Robert A. Williams, Burlington, all
of Mass.

[73] Assignee: Trans-Sonics, Inc., Lexington, Mass.

[22] Filed: Feb. 11, 1972

[21] Appl. No.: 225,471

[52] U.S. Cl. ............................................. 73/304 C
[51] Int. Cl. ............................................. G01f 23/26
[58] Field of Search .................................. 73/304 C

[56] References Cited
UNITED STATES PATENTS

| | | | |
|---|---|---|---|
| 2,868,015 | 1/1959 | Haropulos | 73/304 C |
| 3,010,320 | 11/1961 | Sollecito | 73/304 C |
| 3,224,275 | 12/1965 | Fahley | 73/304 C |
| 3,534,606 | 10/1970 | Stamler et al. | 73/304 C |
| 3,301,056 | 1/1967 | Blanchard et al. | 73/304 C |
| 3,349,301 | 10/1967 | Bell | 73/304 C X |

Primary Examiner—Donald O. Woodiel
Assistant Examiner—Frederick Shoon
Attorney, Agent, or Firm—Cesari & McKenna

[57] ABSTRACT

A fluid level meter achieves enhanced accuracy over the opposite extremes of a fluid level range by utilizing a segmented sensing capacitor providing distinct outputs corresponding to adjacent sensing levels within the range and switching from one segment to the other at the extremes. The meter is calibrated for both zero and full scale with the sensing capacitors completely dry. An intrinsic safety barrier is provided between the sensor and the power supply and measuring circuit.

29 Claims, 4 Drawing Figures

FLUID LEVEL METER

BACKGROUND OF THE INVENTION

1. Field of the Invention

The invention relates to measuring systems, and more particularly to fluid level meters.

2. Prior Art

Various types of meters are utilized to measure fluid level. Among the more common are those utilizing floats connected to mechanical linkages whose motion is a function of the position of the float and thus the fluid level; sight gauges in which the height of the fluid within a bore is compared with a scale associated with the bore tube; and meters utilizing sensors which provide an electrical output directly related to the level of the fluid in which they are immersed. An especially advantageous meter of the latter type is described in U. S. Pat. No. 3,533,286, Vernon C. Westcott et al., issued Oct. 13, 1970 and assigned to the assignee of the present invention. The meter described therein utilizes a capacitive sensor having a pair of sensing electrodes which, when immersed in a fluid, provide an electrical output indicative of the level of the fluid between the plates. A reference sensor which is adapted to be continually immersed in the fluid controls the driving voltage applied to the sensing capacitor in such a manner as to make the output of the sensing capacitor independent of the dielectric constant of the fluid and proportional to the ratio of the sensing capacitance to the reference capacitance; the latter is, in turn, directly proportional to the level of the fluid between the sensing capacitor electrodes.

A fluid level meter of the type described above provides essentially uniform resolution over its length. In some applications, it is desirable to have a meter which has a greater resolution over certain portions of the fluid level range. For example, in measuring the level of a fluid such as liquid natural gas (LNG) in the hold of a tanker, it is desirable to have an especially precise measurement of the fluid level in the upper portion of the hold in order to monitor the filling process and to prevent overfilling. Further, it is also desirable to have an especially precise measurement of fluid level in the lower portion in order to know when the pumping process is completed in emptying the tank. Thus, in commercial tankers carrying liquid natural gas (LNG) or other fluid cargos, it is desirable to have an especially precise measurement of the fluid level at the upper and lower levels in the tank in order to accurately determine the quantity of gas that has been loaded onto, and discharged from, the tanker. A meter for such an application should be neither excessively complex nor unduly costly.

In calibrating a meter for zero and full scale readings, it is customary practice to set the zero reading with the sensors dry, i.e., not immersed in any fluid, and then to set the full scale reading with the sensors fully immersed in the fluid. In applications in which the tank volume is not great or in which the tank is readily filled for calibration purposes, this presents no great difficulty although it may sometimes be inconvenient. However, when the fluid level in a tanker is to be measured, it is impractical to require the vessel to be filled merely for calibration purposes. Thus, although the installation of the fluid level meter may take place in the shipyard at the time the ship is built, its calibration may not be able to take place until the ship has taken on its first load. If problems are encountered with the fluid level meter at this point, it may be impossible to remedy them until the ship has discharged its load and thus the meter will be inoperative until this time.

The gauging of the level of liquid natural gas also provides an excellent illustration of the need for special precautions in transmitting electrical signals to and from the sensors which are immersed in the liquid. Great care must be exercised in order to insure that dangerous voltage and current levels cannot occur in those parts which are immersed in the fluid, that is, the sensors. Thus, provision must be made to protect the sensors from overloads in the power supply and measuring circuitry.

BRIEF SUMMARY OF THE INVENTION

OBJECTS OF THE INVENTION

Accordingly, it is an object of the invention to provide an improved fluid level meter.

Further, it is an object of the invention to provide a fluid level meter having enhanced resolution at one or both extremes of a fluid level range to be measured.

Another object of the invention is to provide a fluid level meter which can be calibrated for both zero and full scale without immersing the sensors in the fluid whose level is to be measured.

A further object is to provide an improved fluid level sensor.

Yet another object of the invention is to provide a fluid level meter having a safety barrier interposed between the level sensors and the power supply and measuring circuitry.

BRIEF DESCRIPTION OF THE INVENTION

The preferred embodiment of the fluid level meter of the present invention utilizes a capacitive level sensor having an essentially constant resolution per unit of length. The sensor is formed from an outer, generally continuous electrode and an inner segmented electrode having three distinct segments, two of which are positioned to sense the fluid level at the extremes of the range and a third of which is intermediate the other two segments. The inner electrode segments at the extremes are shorter then the intermediate segment and thus, while having essentially the same resolution per unit length as the inner segment, provide greater overall resolution at the extremes.

The outer (common) electrode is driven from an oscillator whose output is controlled by the output of a reference sensor which is also driven from the oscillator and is positioned to be normally fully immersed in the fluid whose level is to be measured. The oscillator responds to the reference sensor output in such a manner as to maintain the driving current through the reference sensor constant, independent of changes in the dielectric constant of the fluid whose level is being sensed. This ensures that the output of each sensor is independent of the dielectric constant of the fluid and is dependent only on the level of fluid between the electrodes; it also has the result that the level sensor output is then proportional to the ratio of the level sensor capacitance to the reference sensor capacitance. This is described in detail in U.S. Pat. No. 3,533,286 referred to above.

A switching network is interposed between the level sensor outputs and the indicator which displays the level reading. The level sensor is connected to this indicator through the switching network in accordance with the level of fluid between the sensor segments. This is accomplished by comparing the sensor outputs with reference voltages corresponding to pre-selected levels associated with the sensor segments and connecting or disconnecting the outermost sensor segments to or from the indicator as the fluid level passes into or out of the ranges of these segments.

Preferably, the outputs of the upper and lower segments themselves control the switching so that this is accomplished with desirable precision. When the fluid level is within the range of the lower segment, only this segment is connected to the indicator. Conversely, when the fluid level is within the range of the upper segment, only this segment is connected to the indicator; to account for the fluid below this segment, a fixed signal corresponding to the height of the fluid level at the bottom of the uppermost sensor is switched into the indicator and effectively added to the output of the upper segment so that the total height of fluid may be indicated. At the extremes, therefore, the fluid level is measured with great precision. Intermediate these extremes, all three sensors are connected to the output indicator and the measurement of fluid level is less precise.

The fixed signal which is to be added to the output of the uppermost sensor can be calculated and generated with greater accuracy than it can be obtained by actually measuring the output of the lower and intermediate sensor segments since the length of the sensor can be measured precisely and accurately prior to installation. Further, its changes in length due to immersion in the fluid whose level is to be measured can be calculated from measurement of the fluid temperature and from knowledge of the thermal expansion characteristics of the sensor. The signal is added to the uppermost sensor output in an analog to digital converter which converts the analog sensor outputs to digital form for display. The converter has a digital counter driven from an oscillator through a gate. The gate is opened in response to a voltage-to-time converter which provides a gating pulse whose duration is proportional to the magnitude of a sensor voltage applied to it. This type of converter is known to those skilled in the art.

However, there is also provided a digital storage register which is connected to the counter via a transfer gate. The storage register is preset with a number corresponding to the known height of the bottom portion of the uppermost sensor. When the meter switches to the upper fluid level range, the transfer gates are energized by the switching circuitry to preset the counter with the contents of the storage register. Thus, the fixed signal is added to the uppermost sensor output simply and effectively. This technique allows one to construct a standard meter system and then accommodate it to a given installation readily and inexpensively. Further, it avoids the need for precise, adjustable reference voltage sources. The technique is especially advantageous when the converter is to be switched among several tanks which may have different dimensions and thus different reference heights for the uppermost sensor. In such a case, one need only reset the reference height for each tank prior to measurement. This can be done manually or may be accomplished electrically by the use of a separate storage register for each tank.

Each level sensor segment, as well as the reference sensor, is compensated for its "empty," "dry" or "air" value so that the effective output of each segment corresponds to the change in capacitance of the segment caused by the presence of fluid between its electrodes. The compensation is performed by connecting the output of the segment to a summing junction and there subtracting from it a signal corresponding to the output of the segment when it is empty. Provisions are also made to cancel the effects of stray pickup at the summing junction by adding signals of appropriate magnitude and phase to cancel out the stray pickup.

The sensors are calibrated for zero and full scale. The zero setting is accomplished by subtracting out the "empty" capacitance of each sensor as noted above. Full scale calibration is accomplished by disconnecting this compensation an setting the indicator to read full scale when the sensor is empty.

To calibrate for full scale, one normally would expect to have to immerse the sensor in liquid. This would be extremely bothersome in the case of a large vessel such as a tanker. However, as noted earlier, the level sensor output is effectively the ratio of its capacitance to that of the reference sensor, and this ratio is the same whether both are fully immersed or both are empty. Thus, to calibrate for full scale, one need merely disconnect the empty value compensation of the sensors and set the indicator to read full scale when the sensors are empty. In practice, an adjustment is provided in the measuring circuitry to adjust the output of each sensor segment, and the reference sensor, separately for their full scale value.

When the sensors are to be used in a dangerous environment such as in liquid natural gas (LNG), it is necessary to guard against the application of excessive voltages or currents to them so as to prevent the possibility of fire or explosion. In the present invention, this is accomplished by means of a protective safety barrier interposed between the sensors and the power supply and measuring circuitry. The barrier limits the supply of excessive voltage or current to the sensors from the power supply via the sensor driving circuit and also limits the supply of excessive voltage or current which may travel in a reverse direction to the sensor in case of a malfunction in the measuring circuit.

The mounting of the sensors is important in cryogenic applications since there will be extensive changes in dimensions of the sensors when they are immersed in, or emerge from, the cryogenic liquid. Thus, it is especially important that the sensors be mounted to accommodate relative motion between the sensors and the structure from which they are supported. A simple yet effective supporting bracket which accommodates this motion is described herein.

DETAILED DESCRIPTION OF THE INVENTION

The foregoing and other and further aspects of the invention will be more readily understood when taken in conjunction with the accompanying drawings in which.

Figure 1:
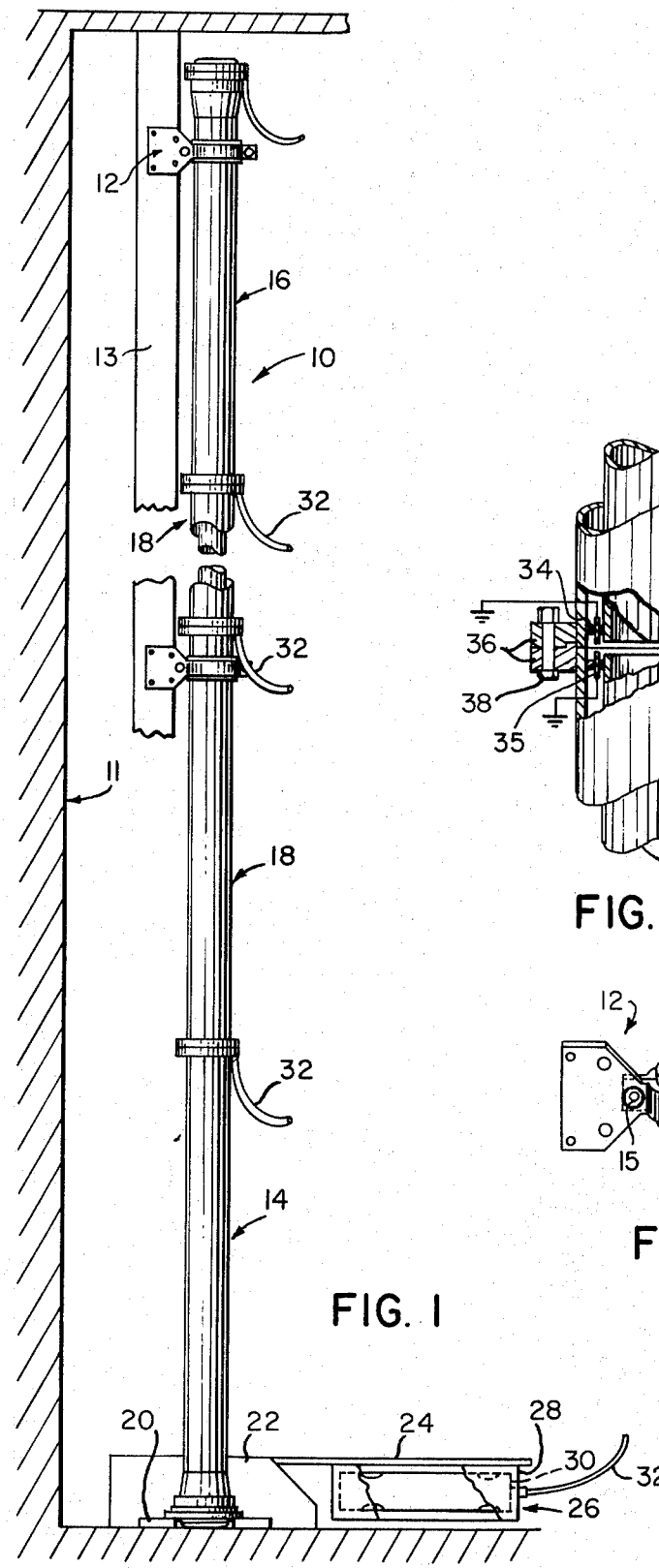
FIG. 1 is a view in perspective of a preferred embodiment of a level sensor constructed in accordance with the invention.
Figure 1B:
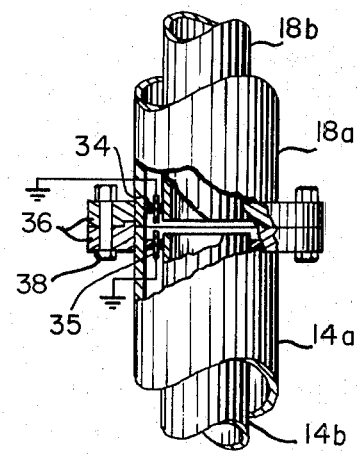
FIG. 1B is an enlarged view, in perspective, of a portion of the sensor.

In FIG. 1 a vertically extending fluid level sensor 10 is illustratively shown positioned in the interior of a tank 11 for immersion in a fluid whose level is to be measured. The sensor is mounted in the tank by means of supporting brackets 12 connected between the sensor column and a mounting plate 13 supported from the roof of the vessel. The sensor 10 is formed from lower and upper sensor segments 14 and 16, respectively, which sense the level of the fluid at the lower and upper extremes of a fluid level range coextensive with the sensor, and one or more intermediate sensor segments 18, 18' which sense the level of the fluid when it is within a range intermediate the extremes.

The sensor 10 is mounted on a base plate 20; the plate 20 is connected to the floor of the tank 11 and provides an accurate reference point for fluid levels. When the tank is a cryogenic fluid tank in a marine tanker, the tank is often a thin shell which is supported above a subfloor of the tanker itself and the weight of the sensor 10 may ultimately be supported from this structure. A platform 22, also connected to the floor of the tank, has an overhanging arm 24 which supports a reference sensor 26 in the form of a cylindrical capacitor having an outer electrode 28 and an inner electrode 30. Electrical energy is applied to, and taken from, the reference sensor 26 and the level sensor 10 by means of cables 32.

Figure 1A:
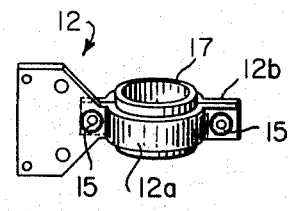
FIG. 1A is an enlarged view in perspective of a supporting bracket for mounting the sensor.

The construction of the supporting brackets 12 is shown in greater detail in FIG. 1A. The bracket 12 has a first segment 12a forming one half of a cylinder and terminating in a flat plate for attachment to the mounting plate 13, and a second segment 12b forming the second half of a cylinder and mating with the first cylindrical segment. The segments are bolted together at opposite ends by means of bolts 15. A split, cylindrical ring 17 is positioned with the cylindrical portion of the bracket 12. The ring 17 serves a dual purpose. First, it electrically insulates the sensor from the supporting structure; second, it allows axial motion of the sensor relative to the supporting bracket so that shrinkage or expansion of the sensor can be accommodated. For these purposes, the ring may advantageously be formed from a material sold under the trademark Rulon and which comprises a mixture of silica and a polytetrafluoroethylene sold under the trademark Teflon.

The sensor construction is shown in greater detail in FIG. 1A. As there shown, the sensor segments 14, 16, 18, 18' etc. are in the form of coaxial capacitors formed from outer electrodes 14a, 18a and inner electrodes 14b and 18b respectively. The electrodes are spaced from each other by means of nonconductive spacers 34. A shielding electrode comprising a grounded conductive plate 35 divides each spacer into inner and outer segments and shunts to ground the displacement current flowing through the outer segment from the outer electrode. This ensures that all the displacement current flowing to the inner electrode crosses through the void space between the electrodes and facilitates sensor calibration as described below. Additionally, capacitive currents between the inner electrode and ground, either through the inner spacer segment or through line capacitance in the cable connecting the inner electrode to the measuring circuits is effectively obviated by feeding the capacitor output to the virtual ground input of a summing amplifier as described in connection with FIG. 2. Thus essentially the entire capacitor output is applied to the measuring circuit.

Separate sensor segments are connected to each other by means of flanges 36 and bolts 38. As may be seen from FIG. 1, the outer electrodes are butted against each other and thus form an electrically continuous electrode. The inner electrodes, in contrast, are separated from each other by a gap and thus form distinct sensor electrodes.

Figure 2:
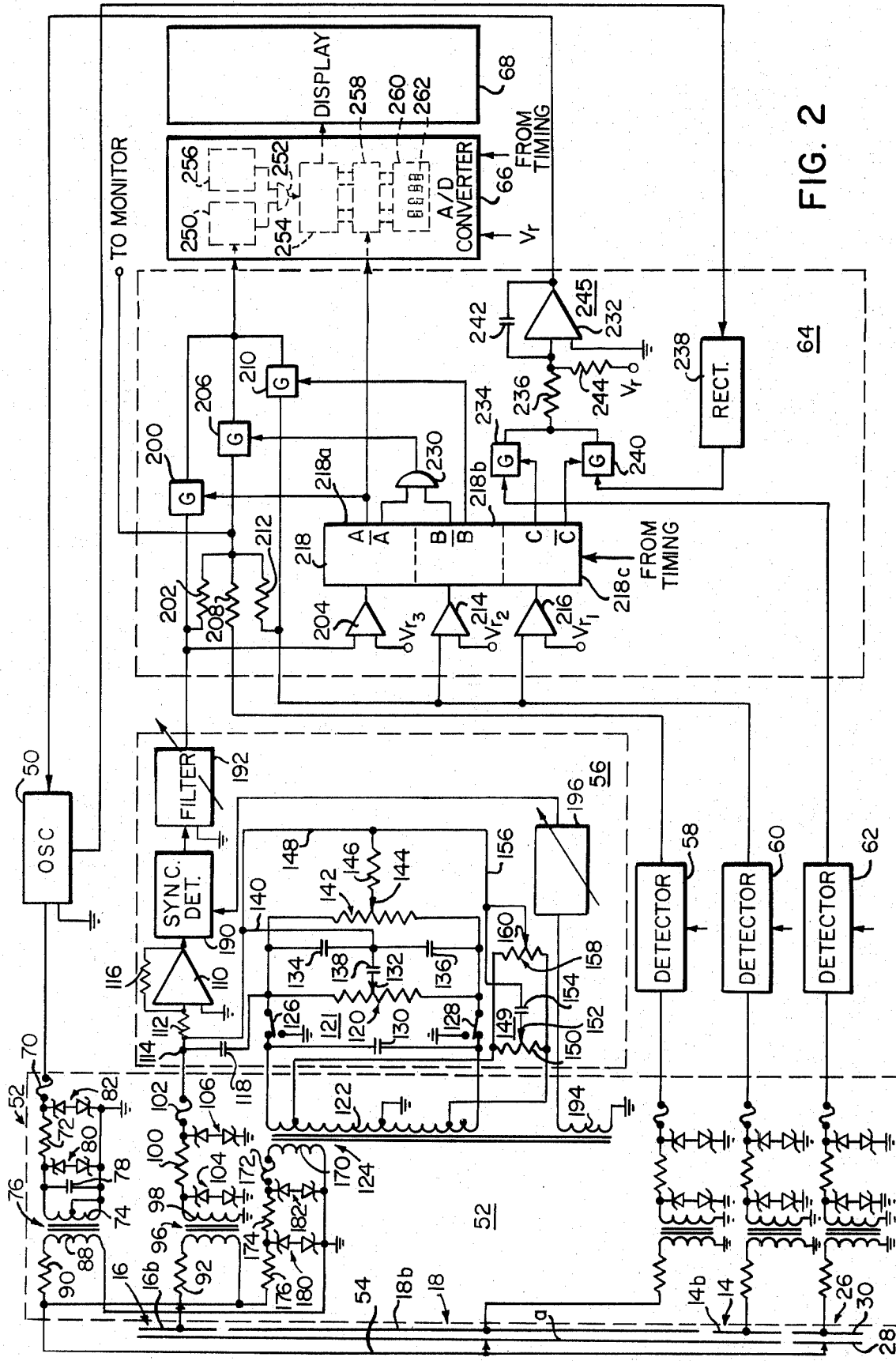
FIG. 2 is a block and line diagram of a preffered form of measuring circuitry incorporating the sensor.

The electrical characteristics of these electrodes will be more readily understood on reference to FIG. 2. The outer electrode, which effectively is a single continuous electrode formed from the outer electrode segments 14a, 18a, etc. and designated as "a," is seen as forming separate level sensors with the segments 14b, 16b, and 18b. Where more than one intermediate segment 18b is utilized, they will hereafter collectively be referred to as a single intermediate segment and their outputs will be considered to be connected together to provide a single output. Each of the sensor segments senses the fluid level between its electrodes over a range coextensive with the length of the electrodes and provides an output indicative of the fluid level between its electrodes.

The outer electrodes of the level and reference sensors are driven over a lead 54 from an oscillator 50 through an intrinsic safety barrier 52. The oscillator 50 drives the sensors with an alternating voltage whose magnitude is controllable in response to a control input as described hereafter. The alternating outputs of the sensors are applied to detectors 56–62 which convert the outputs to steady DC signals which are then applied to a switching circuit 64 and to an analog-to-digital converter 66 and a display unit 68.

The intrinsic safety barrier 52 isolates the power supply and measuring circuitry from the hazardous area in which the sensors and reference capacitors are immersed. Power from the oscillator 50 is supplied through a fuse 70 in series with a resistor 72 and the primary winding 74 of a transformer 76. The winding 74 has a grounded center tap and also has a capacitor 78 connected across it to form a resonant circuit at the frequency of the oscillator output. A first pair of zener diodes 80 is connected in back-to-back configuration from one end of resistor 72 to ground, while a second pair of zener diodes 82 are connected in back-to-back configuration between the other end of resistor 72 and ground. The secondary winding 88 of transformer 76 applies its driving voltage to the sensor and reference capacitors by means of a resistor 90 in series with lead 54.

If a voltage of sufficiently large magnitude is applied across either of the diode pairs 80, 82, these diodes conduct and thereby shunt the primary winding 74 of the transformer 76 to limit the voltage applied across this winding. Additionally, the increased voltage causes increased current to flow through fuse 70 and resistor 72. If the current is sufficiently large, the fuse 70 fails and power is thereby cut off from the transformer. Thus, the primary is multiply protected against the application of excessive voltage to it. A further resistor 90, in series with the secondary winding 88 of transformer 76, additionally limits the driving signal applied to the sensors and thus limits the power fed to the hazardous area. Further protection may be obtained by forming the transformer 76 such that its core saturates when excessive current is applied thereto.

The sensor outputs are also applied in the opposite direction through the safety barrier 52 to the measuring and indicating circuitry. Since the protective circuitry for each of these is identical, only that for the uppermost sensor 16 will be described in detail. The output of sensor 16 is applied through a resistor 92 to the primary winding 94 of a transformer 96. As was previously the case, the core of this transformer saturates when a current of excessive magnitude is applied to it. The secondary winding 98 of this transformer is connected in series with a resistor 100 and a fuse 102 and thence to a detector 56. A first pair of back-to-back zener diodes 104 and a second pair 106 are connected between opposite ends of resistor 100 and ground. It will be noted that in the case of transformer 76 it was the primary winding which carried the main protection against the application of excessive voltage thereto since that winding is on the "safe" side of the barrier, i.e., on the power supply and measuring circuitry side. In the case of the transformer 98, it is the secondary winding which carries the main protection, since here the secondary is on the "safe" side. The primary side of the barrier is thus protected against transfer of excessive power in the reverse direction that may result from a malfunction on the "safe" side of the barrier.

The output of the transformer 96 is applied to an amplifier 110 through a resistor 112 connected between one input terminal of the amplifier and a terminal 114. A negative feedback resistor 116 is connected between the output and input of amplifier 110. The terminal 114 forms a "summing junction," that is, the output of amplifier 110 is proportional to the sum of the inputs supplied to the terminal 114.

A compensating current which compensates for the empty value of sensor 16 is applied to the summing junction from a compensating network 121. A capacitor 118 is connected between the summing junction and one end of a potentiometer 120 in network 121. The potentiometer 120 is connected across the secondary winding 122 of a transformer 124 through switches 126 and 128. A capacitor 130 is also connected across this winding to resonate it at the driving frequency. A wiper arm 132 of potentiometer 120 is connected to the junction of a pair of capacitors 134 and 136 by means of a capacitor 138. The junction of capacitors 134 and 136 is connected to the summing junction via a lead 140. A potentiometer 142 is also connected across the transformer secondary 122. The wiper arm 144 of this potentiometer is connected through a resistor 146 and lead 148 to the summing junction.

The magnitude of capacitor 118 is such that when the secondary winding 122 of transformer 124 is energized, the capacitor 118 supplies to the summing junction a current of magnitude approximately equal to, and polarity approximately opposite to, that supplied by sensor 16 when no fluid is present between its plates, that is the capacitor 118 subtracts from the sensor current at the summing junction a current substantially corresponding to the empty value of the sensor capacitance. Capacitors 134 through 138 then serve as "trimmer" capacitors in order to adjust for any excess or deficiency in the compensating current caused by deviations in the magnitude of capacitor 118 or the driving voltage applied to it. By moving the wiper arm 132 of potentiometer 120 up or down along the potentiometer, one is enabled to select a voltage of desired magnitude and polarity to generate the appropriate adjustment currents for application to the summing junction through capacitor 138. The potentiometer 142 provides a quadrature component to compensate for phase shift between the current supplied to the summing junction by sensor 16 and that supplied by capacitor 118.

Although the current injected into the summing junction 114 should theoretically be zero when the sensors are disconnected from this junction or are empty and compensated for their empty value, in practice it will be found that there is a residual coupling between this junction and other portions of the system so that a small but finite current is injected into the summing junction from sources other than the sensors or the compensating network. This stray pickup is compensated by network 149 which generates in-phase and quadrature currents of selected magnitude and polarity to null the stray pickup at the summing junction. To do this, a portion of the voltage applied across transformer winding 122 is applied to a stray pickup compensating network 149 having a potentiometer 150 whose wiper arm 152 is connected in series with a capacitor 154; the capacitor 154 is connected to the summing junction via a lead 156. A potentiometer 158 connected across the potentiometer 150 has a wiper arm 160 also connected to the summing junction via lead 156. The magnitude and phase of the stray pickup compensating current is thus determined by the position of the arms 152 and 160.

Secondary winding 122 is driven from the primary winding 170 of transformer 124. The winding 170 is energized through a fuse 172, a resistor 174 and a second resistor 176 from winding 88 of transformer 76. A pair of back-to-back zener diodes 180 and 182 are connected from ground to opposite ends of resistor 174. These elements serve the same functions as described in connection with the corresponding elements associated with transformer 76 and therefore will not be described in further detail.

When the sensor circuit is properly compensated for stray pickup, the output of amplifier 110 is the sum of the currents supplied to it from level sensor 16 and from compensating network 121. This output is applied to a synchronous detector 190 and thence to a smoothing filter 192 which includes an amplifier having an adjustable for purposes to be described. The synchronous detector 190 is driven from a secondary winding 194 of transformer 124 through an amplifier and squarer 196 having an internal adjustable phase shift network (not shown) to compensate for phase shifts between the driving voltage applied to the level sensor and that applied to the synchronous detector.

The detectors 58, 60 and 62 are similar in construction and principle to the detector 56. Each detector contains a summing amplifier, a synchronous detector, an averager, an empty value compensation network corresponding to the network 121, a stray pickup compensation network corresponding to the network 149, and a modulator driver circuit and phase shift adjuster corresponding to the amplifier and squarer unit 196. Accordingly, these detectors will not be described in detail.

To calibrate the system, each of the sensors 14, 16 and 18 are first disconnected from the summing junction of their corresponding detectors. Next, the trimming network of each detector, such as the network 121 of detector 56, is also disconnected. The net input to each summing junction should then be zero at this time. If it is not, the stray pickup compensation network of each detector, such as the network 149 of detector 56, is adjusted to provide a zero net input to the corresponding summing junction and thus zero output from the detector. When this is done for each detector, the output of the converter 66 and display 68 should read zero.

The sensors, together with their associated trimming networks, are then again connected to the summing junction of their respective detectors. The trimming networks are each adjusted to provide zero input to the summing junctions when the sensors are driven from the oscillator 50. This is done with all the sensors in the dry state so that, when balance is attained and zero net signal is applied to the summing junctions of the respective detectors, the empty or air value of each of the sensors is precisely compensated for by its associated trimming network. At this point again the output of each detector is zero.

The full scale setting is then obtained by disconnecting each of the empty value compensation networks from the sensors. The system responds as though the sensors had all been filled with fluid, and the detectors 56–62 thus provide their full outputs. The filter and amplifier units in the detectors, such as the unit 192 in detector 56, are adjusted at this point, if necessary, to provide maximum output corresponding to a totally immersed sensor. The displsy 68 then reads full scale and the system is thus accurately calibrated for both zero and full scale readings without immersing the sensors in liquid. As noted previously, this is a distinct advantage in applications such as liquid level gauging on gas tankers or other large vessels.

The output of each of the detectors 56 through 62 is applied to switching network 64. In particular, the output of detector 56 is applied to a gate 200 and also to a resistor 202 and a comparator 204. The output of detector 60 is applied to a gate 206 through a resistor 208, while the output of detector 62 is applied to a gate 210, a resistor 212, and to comparators 214 and 216. These comparators in turn drive corresponding bistable elements or flip-flops in a latch unit 218. Unit 218 contains three flip-flops, each of which provides two distinct outputs, namely, a normal output (A, B or C) which is obtained when the input applied to a corresponding comparator from its associated detector exceeds the magnitude of the reference level applied to that comparator, and an inverted output ($\bar{A}$, $\bar{B}$, $\bar{C}$) which is obtained when the input to a comparator from its associated detector is less than the magnitude of the reference level applied to the comparator. TThe flip-flops are "set" or "reset" at times controlled by a timer or clock (not shown).

When a flip-flop is "set," its normal output is energized or "high" and its inverted output is de-energized or "low." When the flip-flop is "reset," the normal output is "low" and the inverted output is "high." The normal output of flip-flop 218a energizes gate 200 to connect detector 56 to converter 66, while the inverted output of flip-flop 218b energizes gate 210 to connect the output of detector 62 to converter 66. The inverted output of flip-flop 218a and the normal output of flip-flop 218b energize gate 206 through an AND gate 230.

When gate 206 is energized, the outputs of detector 56 through 60 are connected to converter 66 via resistors 202, 208 and 212, respectively. Detector 62 is connected to an amplifier 232 in an integrator circuit 245 via a gate 234 and a resistor 236. A rectifier 238 is connected to amplifier 236 through a gate 240 and resistor 236. Gates 234 and 240 are energized by the normal and inverted outputs respectively of flip-flop 218c. Amplifier 232 has a capacitor 240 connected from output to input. The amplifier 232, resistor 236 and capacitor 242 form an integrator. A second resistor 244 is connected between one input terminal of amplifier 232 and a source of reference potential Vr. The potential Vr is also applied as a reference to converter 66.

The output of integrator 245 controls the amplitude of oscillator 50. When detector 62 is connected to the integrator, the detector output is compared with a predetermined reference current established by the reference voltage Vr. The difference is integrated and applied to oscillator 50 to change its output in such a direction as to reduce the difference between the detector output and the reference current to zero. Thus, a constant current is maintained through reference sensor 26.

The sensor 26 is intended to be immersed in the fluid during normal operation. For this reason it is positioned at the bottom of the vessel whose fluid level is to be measured. However, because of its finite size and the manner in which it is mounted there is a minimum fluid level below which it will not be fully immersed. However, the lower level sensor is still operative at this level. Accordingly, an artificial reference for the oscillator must be provided as long as the fluid is below this minimum level. This is accomplished by rectifying and filtering a portion of the output of oscillator 50 in a rectifier 338 and applying it to integrator 245 through a gate 240. When the fluid level is less than the minimum level required to fully immerse the reference sensor, flip-flop 218c is "reset," the normal output C is low, the inverted output $\bar{C}$ is high, gate 234 is open so that reference sensor 26 is disconnected from integrator 245 and gate 240 is closed so that an artificial reference established by rectifier 238 is connected to the integrator. This sets the oscillator output to a reference amplitude. When the fluid level rises above the minimum level, comparator 216 sets flip-flop 218c. This opens gate 234 to connect sensor 26 to integrator 245 and closes gate 240; normal operation then resumes. During this time, sensor 14 is connected to converter 66 through gate 210.

As the fluid level continues to rise, the output of sensor 14 increases until the fluid level reaches the uppermost ends of its plates and the sensor provides essentially its maximum output. The reference level $Vr_2$ applied to comparator 216 is set so that the magnitude of the output of sensor 14 exceeds this reference level at that point; the comparator then sets flip-flop 218b to its normal state with its B output "high." This disconnects sensor 14 from converter 66. The fluid level is still insufficient to trigger comparator 204 at this point, so that the inverted output $\bar{A}$ of flip-flop 218a is high and AND gate 230 is closed. Gate 230 energizes gate 206 and connects the signals applied through resistors 202, 208 and 212 to the converter 66. This sums the output of detectors 56, 58 and 60 so that the outputs of all three sensing capacitors are connected to the converter.

When the liquid level has risen sufficiently high to reach the bottom of the uppermost sensor 16, the comparator 204 receives an output from this sensor of a magnitude in excess of the reference level voltage $V_{r_3}$ and this sets flip-flop 218a to the normal state. This opens gate 200 to connect sensor 16 to converter 66 and simultaneously closes gate 230 and thus gate 206. Thus, only sensor capacitor 16 is now connected to converter 66. At this time, the A output of flip-flop 218a also pre-sets converter 66 to a magnitude corresponding to the height of the bottom of the uppermost sensor above the base reference. This height is precisely known from accurate measurements of the lengths of the segments and from the temperature characteristics of the sensor and the temperature of the fluid in which it is immersed. Effectively, in this mode, the converter 66 responds only to changes above this reference height caused by changes in fluid level between the plates of sensor 16. Thus, as the fluid level rises in the vessel, its height is measured first by the lowermost sensor 14 only as long as it is in the lowermost range, then by all three sensing capacitors when the fluid level is in its intermediate range, and then finally by sensor capacitor 16 only when the fluid level rises to the uppermost range. A low accuracy monitor may be connected to the common point of resistors 202, 208, and 212.

The converter 66 is provided to digitize the fluid level readings. If an analog output is desired, the converter and display may be replaced by a suitable analog indicating meter. When a digital output is desired, however, the converter is preferably of the type illustrated in FIG. 2, in which the analog voltage from the detectors is first converted to a rectangular pulse whose duration is proportional to the magnitude of the voltage. This is readily accomplished, for example, by applying the signal voltage to a comparator together with a ramp voltage which is switched on simultaneously with the start of the ramp and which is switched off by the comparator when the ramp voltage exceeds the signal voltage. Such a circuit forms a voltage-to-time converter such as the converter 250 of FIG. 2 and its output opens a gate 252 for the duration of the pulse. When opened, the gate 252 connects a digital counter 254 to a pulse generator 256 which pulses the counter at a fixed rate and thus drives it to a count determined by the magnitude of the analog voltage applied to the converter 250.

When the uppermost sensor is connected to the converter 66, the normal output of flip-flop 218a is high, and this energizes a transfer gate 258 to connect a digital storage register 260 to the counter 254. This presets the counter 254 to a count determined by the count in register 260. The latter count corresponds to the height of the bottom of the uppermost sensor, and is set into the register 260 by means of "thumbwheels" 262. The counter 262 then counts up from this number in response to inputs to the converter 250. The conversion process takes place in accordance with timing established by a timing unit or clock (not shown).

although the reference sensor will most commonly be fixed in place at the bottom of the tank, it may sometimes be found advantageous to utilize a reference which "follows" the fluid level. Such would be the case, for example, where an uneven temperature distribution exists in the fluid over the range of fluid levels to be measured. When this is the case, the system may be adapted to utilize any sensor which is fully immersed, the most advantageous sensor, of course, being the segment immediately below the segment which is only partially immersed, although other segments may also be used. The switching circuitry 64 is readily modified to achieve this.

It should also be understood that the high accuracy segments can be located at any position within the range and need not necessarily be restricted to the extremes. For example, in a spherical tank with the level sensor running along a tank diameter from the bottom to the top, the volume of liquid in the tank changes less rapidly with changes in level at the upper or lower extremes than it does nearer the middle. Thus, it may be found desirable to locate the high accuracy segment or segments nearer the middle of the range in such a case.

From the foregoing it will be seen that we have provided an improved fluid level meter. The meter has enhanced resolution over one or more portions of a range over which the fluid level is to be measured and is readily calibrated for both zero and full scale without immersing the sensors in the fluid itself. The meter readily accommodates a presetting command to further enhance its resolution over a portion of the range. A unique segmented sensor is incorporated in the meter and is suspended to accommodate motion caused by temperature changes. Further, we have provided an improved safety barrier for electrically isolating the sensors from the driving and measuring circuitry so that the sensors can be placed in a hazardous environment with little danger of fire or explosion which may be caused by electrical faults in the system.

The ability to preset the analog to digital converter with a number corresponding to a predetermined reference level further enhances the accuracy of the system. It will be clear that this aspect of the invention need not be restricted to fluid level meters but has broad application to any type of measuring system, such as temperature measurements, density measurements, etc.

It will be understood from the foregoing that various changes may be made in the invention without departing from its spirit or scope and it is intended that the foregoing be taken as illustrative only and not in a limiting sense.

Having described a preferred embodiment of our invention, we claim:

1. A fluid level meter having enhanced resolution over portions of a fluid level range over which the meter is to operate, said meter comprising:
   A. first, second and third fluid level sensors for immersion in the fluid whose level is to be measured and providing, in response to a driving signal, outputs indicative of the extent to which they are immersed
      1. said first sensor providing an output corresponding to a first portion of said fluid level range,
      2. said third sensor providing an output corresponding to a third portion of said fluid level range,
      3. said second sensor providing an output corresponding to a second portion of said fluid level range intermediate said first and third portions,
      4. said first, second and third portions collectively defining said fluid level range,
      5. said second sensor being characterized by a resolution less than that of said first and third sensors,
   B. means for electrically driving said sensors, C. an indicator, and D. switching means responsive to the fluid level
   1. for connecting only the first sensor to the indicator when the fluid level is in said first portion and
   2. for connecting to the indicator only the third sensor and a signal corresponding to the height of both said first and second sensors when the fluid level lies in said third portion.

2. A fluid level meter according to claim 1 in which said switching means is actuated by the first and third sensor outputs respectively.

3. A fluid level meter according to claim 2 which includes first and second comparators for comparing the outputs of said first and third sensors with first and second predetermined reference signals corresponding to first and second fluid reference levels, respectively, the first comparator enabling the switching means to connect only the first sensor to the indicator when the fluid level is below said first reference level and enabling the switching means to connect only the third sensor to the indicator when the fluid level is above said second reference level.

4. A fluid level meter according to claim 1 which includes:
   A. a reference sensor positioned to provide a reference output whenever the fluid level is above a first minimum level,
   B. a reference level generator providing an output corresponding to the output provided by the reference sensor when the fluid level is above a second minimum level,
   C. a driving generator providing an output controlled by a reference input applied thereto, and
   D. a switch
      1. connecting the reference sensor output as a reference input to the signal generator when the fluid level is above the second minimum level, and
      2. connecting the reference level generator output as a reference input to the signal generator when the fluid level is below the second minimum level.

5. A fluid level meter according to claim 4 in which said switch is actuated in response to the output of the first sensor.

6. A fluid level meter according to claim 5 which includes a comparator having the output of the first sensor applied as a first input thereto, and having a signal corresponding to the second minimum level applied as a second input thereto, and providing an output whenever the first input exceeds the second input.

7. A fluid level meter according to claim 1 which includes a comparator having the output of the third sensor applied as a first input thereto and a reference signal corresponding to the lower level of the second fluid level range applied as a second input thereto, said comparator providing an output causing said fixed magnitude to be set into said indicator when the first comparator input exceeds the second comparator input.

8. A fluid level meter having enhanced resolution over portions of a fluid level range over which the meter is to operate, said meter comprising:
   A. first, second and third capacitive sensors
      1. for immersion in the fluid whose level is to be measured,
      2. providing, in response to a driving signal, outputs indicative of the extent to which they are immersed,
      3. formed from first, second and third distinct inner electrodes and a common outer electrode spaced from said inner electrodes,
      4. the outputs being taken from the respective inner electrodes,
      5. the first and third sensors providing outputs corresponding to first and third fluid level ranges, respectively, including said portions,
      6. the second sensor providing an output corresponding to a second fluid level range intermediate said first and third ranges and having a resolution less than the resolution of such first and third sensors,
   B. means for applying a driving signal to said outer electrode,
   C. an indicator for providing an indication of the fluid level within said fluid level range in response to inputs applied thereto from said sensors,
   D. switching means responsive to the sensor outputs to connect the outputs of selected ones of said sensors to said indicator dependent on the location of the fluid level
   E. a reference sensor providing, in response to said driving signal, an output indicative of the level of a fluid in which it is immersed,
   F. means for subtracting from each level sensor output and from the reference sensor output a signal corresponding to the output provided by each said sensor when the sensor is not immersed in fluid, to thereby establish the zero point of the level range,
   G. means for varying the driving signal in accordance with the reference sensor output to maintain the current through said sensor constant,
   H. means for summing the outputs of each of the sensor capacitors,
   I. means for disabling the level sensor subtracting signal means while the sensor capacitors and reference sensors are empty, and
   J. means for setting said indicator to read full-scale to thereby establish the full scale reading of said meter without immersion of said sensor.

9. A fluid level meter according to claim 8 which includes a safety barrier for applying the driving signal to the sensors, said barrier comprising:
   A. a transformer having a primary winding for connection to the driving signal and a second winding for connection to the outer electrode,
   B. a current limiting resistor in series with the primary winding,
   C. a current limiting resistor in series with the secondary winding, and
   D. overload voltage protection means connected across said primary and forming a shunt path for current when a voltage in excess of a predetermined amount is applied to said primary.

10. A fluid level meter according to claim 9 in which the overload voltage protection means comprises first and second pairs of zener diodes, each pair being connected back-to-back across said primary and being separated from the other by said current limiting resistor.

11. A fluid level meter according to claim 8 which includes a safety barrier for receiving the driving voltage from each said sensor, each said barrier comprising:

A. a transformer having a primary winding for receiving the sensor output and a secondary winding for connection to said indicator, B. a current limiting resistor in series with the one of said windings, C. a current limiting resistor in series with the other of said windings, D. overload voltage protection means connected across one of said windings forming a shunt path for current when a voltage in excess of a predetermined amount is applied to the other of said windings.

12. A fluid level meter according to claim 11 in which the overload voltage protection means comprises first and second pairs of zener diodes, each pair being connected back-to-back across said one winding and being separated from the other pair by the current limiting resistor in said winding.

13. A fluid level meter according to claim 8 in which the means for subtracting from each leve sensor output a signal corresponding to the otuput provided by each respective sensor when the sensor is not immersed in fluid comprises a reference capacitor having a nominal value approximately that of the sensor capacitor to be compensated, and which includes means for compensating each sensor capacitor for the empty value thereof, said means comprising:

A. at least one trimming capacitor for use in connection with the reference capacitor, B. a summing junction, C. means connecting tthe sensor capacitor output to said junction, D. means connecting one end of the reference capacitor to the summing junction, E. means connecting the other end of the reference capacitor to a source of potential of such polarity as to apply a signal to the summing junction through the capacitor of a polarity opposite that of the sensor capacitor output, F. means connecting one end of the trimming capacitor to the summing junction, G. means connecting the other end thereof to a source of potential of selectable polarity so as to apply a signal of selectable polarity to the junction through the trimming capacitor, the sum of the signals applied through the reference and trimming capacitors being equal in magnitude and opposite in polarity to that applied to said junction by the sensor capacitor.

14. A fluid level meter according to claim 13 which includes means for compensating for stay pick-up at said summing junction, said means comprising:

A. a source of alternating voltage in phase with the voltage applied to the reference and trimming capacitors and providing voltages of opposite polarity with respect to a common reference, B. first and second potentiometers, each having a movable wiper arm and having opposite ends connected across said source to terminals of opposite polarity, C. a capacitor connected between a first wiper arm and said summing junction, and D. means connecting a second wiper arm to said summing junction, E. whereby in-phase and quadrature signal components may be applied to said summing junction.

15. A fluid level meter according to claim 13 in which a portion of the driving signal applied to the sensor capacitor is also applied to the reference and trimming capacitors.

16. A fluid level meter according to claim 8 including a synchronous detector connected in electrical circuit between each said sensor and said indicator for detecting the sensor outputs prior to application to said indicator.

17. A fluid level meter having greater resolution over a first fluid level range than over a second fluid level range, comprising:

A. a first fluid level sensor;
  1. for immersion in the fluid whose level is to be measured,
  2. providing, in response to a driving signal, an output indicative of the extent to which it is immersed,
  3. having a resolution of a first magnitude, and
  4. operating over a first fluid level range forming a portion of the total range level to be measured, B. a second fluid level sensor:
  1. for immersion in the fluid whose level is to be measured,
  2. providing an output indicative of the extent to which it is immersed in response to a driving signal,
  3. having a resolution less than that of said first sensor, and
  4. operating over a second fluid level range greater than the first fluid level range and forming the remaining portion of the total range level to be measured, and C. indicator means selectively responsive to said sensor outputs to provide an indication of the fluid level within said total level range; and D. switching means responsive to the level of fluid within said first sensor for applying only the first sensor output to the indicator when the fluid is within a first subrange of said total range and applying both sensor outputs to the indicator when the fluid is outside said first subrange.

18. A fluid level meter according to claim 17 in which said switching means comprises:

A. a comparator for comparing the first sensor output to a predetermined reference level signal and supplying a selected output when said sensor output exceeds said reference level, and B. a gate responsive to said first comparator output for connecting said first sensor output to said indicator means.

19. A fluid level meter according to claim 18 which includes:

A. means for summing the outputs of said first and second sensors prior to application to said indicator means, B. a second comparator for comparing the first sensor output to a second reference level and providing a selected output when said second sensor output exceeds said second reference level, and C. a second gate responsive to the second comparator output to connecting the summed sensor outputs to said indicator.

20. A fluid level meter according to claim 17 in which said first and second fluid level sensors are formed from inner and outer coaxial electrodes, the outer electrode being electrically continuous, the inner electrode being electrically discontinuous to form first and second electrode segments corresponding to said first and second sensors.

21. A fluid level meter according to claim 20 which includes compensating means for each sensor capacitor for compensating for the empty value of each said capacitor, said means comprising:
  A. a reference capacitor having a nominal value approximately that of the sensing capacitor to be compensated,
  B. a trimming capacitor for modifying the effective value of said reference capacitor,
  C. means for driving said reference capacitor with a driving signal of opposite phase to the driving signal applied to the corresponding sensor capacitor whereby the reference capacitor provides an output of opposite polarity output to the sensor capacitor output,
  D. means for driving said trimmer capacitor with a driving signal of adjustable magnituded and whose phase is selectable to be the same as, or opposite to, the phase of said sensor capacitor driving signal, and
  E. means connecting the reference and trimmer capacitor outputs and the corresponding sensor capacitor output to a common summing junction.

22. A fluid level meter according to claim 21 which includes means for compensating for quadrature effects in the sensor capacitor and which comprises applying to said summing junction a driving signal of selectable amplitude and polarity and in phase with the driving signal applied to the sensor capacitor.

23. A fluid level meter according to claim 17:
  A. in which said first and second sensors are formed from:
    1. an outer electrode to which said driving signal is applied, and
    2. first and second separate inner electrodes spaced from said outer electrode and forming first and second capacitive sensors respectively therewith, and
  B. which includes means for each sensor for compensating for the empty value of each said sensor, said compensating means comprising:
    1. a reference capacitor having a nominal capacitance approximately that of a corresponding sensor capacitor,
    2. a trimmer capacitor,
    3. a transformer having a primary winding connected in parallel with the outer electrode driving signal and a secondary winding having an intermediate portion thereof connected to a common reference potential, opposite ends of the secondary winding providing opposite voltages with respect to said common potential,
    4. a potentiometer connected across said secondary winding and having a movable wiper arm providing an output voltage whose magnitude and polarity are dependent on the position of said wiper arm,
    5. means connecting the output of a selected sensor to a summing junction to apply a signal thereto proportional to the capacitance of said sensor,
    6. means connecting said reference capacitor between said summing junction and one end of said secondary winding to provide a signal to said junction whose phase is of opposite polarity to that of said sensor output, and
    7. means connecting said trimmer capacitor between said summing junction and said wiper arm to thereby apply to said summing junction a signal whose magnitude and phase is selectable to add to, or subtract from, the reference capacitor output.

24. A fluid level meter according to claim 23 which includes:
  A. a second potentiometer connected across said secondary winding and having a movable wiper arm providing an output voltage whose magnitude and polarity are dependent on the position of said arm, and
  B. means connecting said wiper arm to said summing junction to add or subtract a signal therefrom in quadrature relation with signal supplied by the reference and trimmer capacitors.

25. A fluid level meter according to claim 24 which includes means for compensating for stray signal pickup at said summing junction, said means comprising:
  A. a potentiometer having a movable wiper arm and bridged across at least a portion of said transformer secondary at points which are of opposite polarity,
  B. a capacitor connected between said wiper arm and said summing junction and providing a corrective signal of selectable magnitude and a first phase to said junction,
  C. a second potentiometer having a movable wiper arm and bridged across said first potentiometer, and
  D. means connecting the wiper arm of said second potentiometer to said summing junction to thereby provide thereto a corrective signal of selectable magnitude and a second phase in quadrature with said first phase.

26. A fluid level meter according to claim 17 including means to preset said indicator with a reference number corresponding to the height of a reference level of one of said sensors above a selected reference datum, said indicator being adapted to total said number and a number corresponding to the output of the other of said sensors when the fluid is sensed by said other sensor to thereby provide an indication of fluid height above said reference datum.

27. A fluid level meter according to claim 26 in which the indicator includes:
  A. a counter,
  B. means converting a voltage from said other sensor to a pulse train containing a number of pulses proportional to the magnitude of said voltage for driving said counter,
  C. a storage register containing said reference number, and
  D. a gate interposed between said counter and said register and energizable to preset said counter with the number in said register.

28. A fluid level meter according to claim 27 in which said register is manually settable to any of a plurality of numbers.

29. A fluid level meter according to claim 17 which includes means for supporting said sensors in said tank, said means comprising:
  A. a sleeve of a low friction, electrically insulating material for circumferentially engaging said sensor,
  B. a clamp surrounding said sleeve and adapted for attachment to the tank, and
  C. said sensor axially moving in said sleeve in response to changes in sensor dimension caused by temperature changes.

* * * * *